(12) United States Patent
Korthals et al.

(10) Patent No.: US 9,796,366 B2
(45) Date of Patent: Oct. 24, 2017

(54) BRAKING DEVICE FOR A MOTOR VEHICLE HAVING PREPARATORY PRE-DECELERATION AND METHOD FOR CONTROLLING SUCH A BRAKING DEVICE

(71) Applicant: Robert Bosch GmbH, Stuttgart (DE)

(72) Inventors: Christian Korthals, Bietigheim-Bissingen (DE); Michael Bachmann, Weissach (DE); Harald Michi, Oelbronn-Duerrn (DE); Michael Schubert, Althengstett (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/440,655

(22) PCT Filed: Sep. 10, 2013

(86) PCT No.: PCT/EP2013/068653
§ 371 (c)(1),
(2) Date: May 5, 2015

(87) PCT Pub. No.: WO2014/072098
PCT Pub. Date: May 15, 2014

(65) Prior Publication Data
US 2015/0283985 A1    Oct. 8, 2015

(30) Foreign Application Priority Data

Nov. 8, 2012 (DE) .................. 10 2012 220 361

(51) Int. Cl.
*B60T 8/74* (2006.01)
*B60T 7/22* (2006.01)
*B60T 8/32* (2006.01)

(52) U.S. Cl.
CPC ...... *B60T 8/74* (2013.01); *B60T 7/22* (2013.01); *B60T 8/326* (2013.01); *B60T 2201/02* (2013.01); *B60T 2201/12* (2013.01)

(58) Field of Classification Search
CPC .................................. B60T 8/326; B60T 8/74
(Continued)

(56) References Cited

U.S. PATENT DOCUMENTS 6,026,347 A * 2/2000 Schuster .................. B62D 1/28
                                                               180/167
6,296,326 B1 * 10/2001 Steiner .................... B60T 7/042
                                                               303/125

(Continued)

FOREIGN PATENT DOCUMENTS

DE    103 25 266    1/2004
DE    103 22 554    12/2004

(Continued)

OTHER PUBLICATIONS

International Search Report for PCT/EP2013/068653, dated Dec. 6, 2013.

*Primary Examiner* — Redhwan K Mawari
*Assistant Examiner* — Anshul Sood
(74) *Attorney, Agent, or Firm* — Norton Rose Fulbright US LLP; Gerard Messina (57) ABSTRACT

A braking device for a motor vehicle has a setpoint controlled deceleration device, which, upon receipt of a braking request input by a driver or an assistance system, for example, on the basis of a difference between a setpoint value and an actual value, drives a brake of the vehicle to generate a setpoint controlled braking torque for a deceleration of the motor vehicle. In addition, the braking device has a braking preparation control, which, upon receipt of a braking preparation signal, drives the brake independently of the setpoint value to produce at least one braking pressure (Continued)

for generating a preparation braking torque for a pre-deceleration of the motor vehicle. The braking preparation signal is generated as soon as a driving situation is ascertained where a braking request input by a driver or an assistance system is very likely imminent.

12 Claims, 2 Drawing Sheets

(58) Field of Classification Search
USPC .......................................................... 701/70
See application file for complete search history.

(56) References Cited

U.S. PATENT DOCUMENTS

| | | |
|---|---|---|
| 6,473,681 B1 | 10/2002 | Eckert et al. |
| 6,526,344 B2 | 2/2003 | Tamura et al. |
| 6,932,441 B2 | 8/2005 | Hellmann et al. |
| 2001/0027370 A1 | 10/2001 | Tamura et al. |
| 2002/0107629 A1 | 8/2002 | Maruko et al. |
| 2004/0041471 A1 | 3/2004 | Hellmann et al. |
| 2007/0282510 A1* | 12/2007 | Nimmo ............... B60T 8/243 701/70 |
| 2011/0238268 A1* | 9/2011 | Watanabe ............ B60T 8/1755 701/48 |

FOREIGN PATENT DOCUMENTS

| | | |
|---|---|---|
| DE | 10 2009 058154 | 6/2011 |
| DE | 10 2011 003494 | 8/2012 |
| JP | 2001-063541 A | 3/2001 |
| JP | 2001-233190 A | 8/2001 |
| JP | 2002-512148 A | 4/2002 |
| JP | 2004-528217 A | 9/2004 |
| JP | 2006-007850 A | 1/2006 |

* cited by examiner

BRAKING DEVICE FOR A MOTOR VEHICLE HAVING PREPARATORY PRE-DECELERATION AND METHOD FOR CONTROLLING SUCH A BRAKING DEVICE

BACKGROUND OF THE INVENTION

1. Field of the Invention

The present invention relates to a braking device for a motor vehicle, as well as to a method for controlling such a braking device, in particular in cooperation with an autonomous cruise control.

2. Description of the Related Art

Braking devices in motor vehicles are used for selectively decelerating the motor vehicle in the course of a braking operation, i.e., for reducing the velocity of the vehicle, respectively minimizing an increase in the vehicle velocity caused by external influences, such as downhill driving. To this end, a braking device can have brakes that are coupled to the wheels of the motor vehicle and that induce a braking torque on a corresponding wheel, for example, by a pressing of a brake lining against a brake disk. Alternatively to a hydraulic pressing of a brake lining, a braking device can also have brakes in the form of other deceleration mechanisms, such as an electric generator that is coupled to one or a plurality of wheels, for example, and is able to apply a drag torque to the wheel, respectively the wheels, or an eddy-current brake. Typically, each wheel of the motor vehicle is equipped with a corresponding brake. In response to a braking request input by a driver via a brake pedal, for example, the brakes can produce a retarding braking torque on the wheels of the motor vehicle.

Besides the brakes, a braking device in modern motor vehicles includes an open-loop control, respectively a closed-loop control for the open loop, respectively closed loop control of the braking torques that are to be produced by the plurality of motor vehicle brakes in accordance with a setpoint input. This permits individual open loop, respectively closed loop control of the individual wheels, for example, for the braking torques required for an optimum total deceleration of the motor vehicle.

Additionally, during the operation thereof, driver assistance systems, such as an autonomous cruise control, for example, make a targeted selection of desired setpoints for a vehicle deceleration to be implemented and transmit the same to an open-loop control, respectively closed-loop control of a braking device, for example, in order to brake the vehicle independently of a braking request input by a driver, for example, when the vehicle is about to come too close to a vehicle in front.

Braking controls of longitudinal-dynamic functions in a driver assistance system are generally based on a setpoint operated deceleration control. A motor vehicle brake is not actuated until a significant deviation is obtained between a nominal value and an actual value. On the other hand, in the case of such a characteristic curve of controller input variables, the braking torque is reduced to zero, and the brake is completely disengaged during the process, without taking other indicators into account that describe the driving situation.

Instead of a closed-loop control of the deceleration, an open-loop control thereof may also be used where a braking torque to be produced by the braking, that is activated by a trigger, for example, is set to a fixed setpoint value in response to the occurrence of an emergency braking situation.

In connection with driver assistance systems, there are generally prioritization rules that always accord priority to an influencing control by the driver. Such a prioritization of an influencing control executed by the driver routinely leads, for example, to cancellation of an active braking deceleration of the vehicle implemented by a driver assistance system in the course of an autonomous longitudinal control that must be reinitiated following the driver intervention.

It has been noted that specific problems can arise, particularly in the case of braking devices, which, on the one hand, for example, have a setpoint operated open-loop deceleration control, respectively closed-loop deceleration control, to allow an influencing control by a driver assistance system, and which, on the other hand, always accord priority to an influencing control by the driver. In many driving situations, for example, it can happen that implementation of a setpoint controlled braking torque is delayed, and/or that noises that the driver perceives as disturbing can arise which are attributable to a requisite braking pressure being built up for a hydraulic brake, for example.

BRIEF SUMMARY OF THE INVENTION

A braking device and a method for controlling such a braking device for a motor vehicle are provided, which are able to avoid or at least minimize, inter alia, the above mentioned problems of conventional braking devices.

In a first aspect of the present invention, a braking device for a motor vehicle is provided that features a setpoint controlled deceleration device, which, upon receipt of a braking request input by a driver or an assistance system, on the basis of a difference between a setpoint value and an actual value, or merely on the basis of a defined setpoint value, drives a brake to generate a setpoint controlled braking torque for a setpoint value-oriented deceleration of the motor vehicle. It is a distinguishing feature of the braking device that, besides the setpoint controlled deceleration device, it also features what is generally referred to as a braking preparation control, which, upon receipt of a braking preparation signal, drives the brake independently of the setpoint value to produce at least one preparation braking torque for a significant pre-deceleration of the motor vehicle.

In a second aspect of the present invention, a method is provided for driving such a braking device where a braking preparation signal is generated as soon as a driving situation is ascertained where a braking request input by a driver or an assistance system is very likely imminent, the braking preparation signal being subsequently transmitted to the braking preparation control of the braking device.

The braking device in accordance with the first aspect of the present invention, as well as the method for the driving thereof in accordance with the second aspect of the present invention may be considered as being based, inter alia, on the following realizations and ideas:

In the case of the initially described mechanisms of conventional braking devices, where, on the one hand, a setpoint operated deceleration device, which, for example, may be in the form of a setpoint operated, open-loop deceleration control or a setpoint operated, closed-loop deceleration control, and which, for example, ensures that a brake is driven in response to a request from an assistance system, and where, on the other hand, a prioritization of an influencing control by the driver may ensure that a braking deceleration initiated in this manner is discontinued, respectively temporarily interrupted in the course of an autonomous longitudinal control, the situation may arise where a rapid deceleration buildup is supposed to take place under the unfavorable initial condition of a completely disengaged brake, for example. This may occur, inter alia, in driving situations where, already in the preliminary stages, for example, already upon disengaging the brake, a need for a subsequent, repeated brake activation may be very likely deduced, for example, with the aid of situation-recognizing logic circuitry.

At this point, a preparative driving of a braking system is provided that is variable depending on the situation, for example, and that produces an adapted braking torque, in particular in the preliminary stages of an expected open-loop deceleration control or of braking by the driver, and/or enhances braking readiness.

To this end, the braking device is provided with what is generally referred to as a braking preparation control, which, in response to receiving what is generally referred to as a braking preparation signal, drives the brake independently of the setpoint value specified by the driver or the assistance system to at least produce a predefined minimum braking torque, referred to here as a preparation braking torque, for a pre-deceleration of the motor vehicle.

In other words, it is intended that the braking preparation control drive the brake in a way that, even when no braking action is actively requested by the driver or the assistance system, allows it to effect a certain deceleration of the motor vehicle by a slight actuation of the brake. This slight deceleration is referred to here as pre-deceleration and should be of a magnitude significant enough to actually brake the motor vehicle at least somewhat measurably. For example, the pre-deceleration may be at least $0.1$ m/s$^2$, preferably, at least $0.3$ m/s$^2$, and more preferably at least $0.5$ m/s$^2$. The pre-deceleration should be of a magnitude significant enough to differ measurably from other decelerations that may influence the motor vehicle independently of the braking induced, for example, by drag torques, head wind, different road conditions, etc.

The action of the preparation braking torque may be triggered in the braking device in response to receipt of a preparation braking signal, this braking preparation signal being generated, for example, as soon as a driving situation is ascertained where it may be assumed that, in the immediate future, i.e., for example, in the next seconds or fractions of seconds, a repeated braking request is imminent with a high probability, for example of more than 50%, preferably of more than 90%.

The driving situation may be appropriately recognized by an open-loop control of an autonomous cruise control, for example. Such an autonomous cruise control is also sometimes referred to as an ACC (adaptive cruise control). Alternatively, a driving situation may also be recognized using a video system or by analyzing the actuation of an accelerator pedal, a brake pedal and/or a steering by the driver.

The braking preparation signal may be a simple binary signal, that merely indicates whether or not a renewed braking request is to be expected with high enough probability within a predetermined future time interval.

Alternatively, different types of braking preparation signals may be generated depending on the probability of an imminent braking request being input by a driver or an assistance system, and/or as a function of a criticality of a current driving situation.

If a braking preparation signal is generated in the course of a driving situation recognition, a request to a brake controller follows that is independent of a longitudinally dynamic target variable specified by a driver or an assistance system in connection with a braking request, to again build up a braking torque, for example via a prefill function for a hydraulic brake or, alternatively, to not completely reduce an already existing braking torque.

In other words, if a setpoint controlled braking torque has not been previously generated, upon receipt of the braking preparation signal, it is intended that the braking preparation control drive the brake to increase the braking torque produced by the brake to a predetermined preparation braking torque.

If, alternatively, a setpoint controlled braking torque has already been previously generated, upon receipt of the braking preparation signal, it is intended that the braking preparation control drive the brake not to reduce the previously generated setpoint controlled braking torque to zero, rather merely to a preparation braking torque to be minimally maintained.

If a driving-situation recognition device is designed for generating different types of braking preparation signals as a function of the probability of a future braking request and/or of the criticality of a driving situation, the braking preparation control may be configured accordingly to receive these different types of braking preparation signals and, as a function of the received braking preparation signal, to drive the brake to generate a braking preparation signal-specific preparation braking torque for a pre-deceleration of the motor vehicle.

The braking preparation signal-specific preparation braking torque may be suitably selected for each of the potential braking preparation signals in a way that allows the brake to be driven, for example, to produce a specific braking torque and with a specific braking torque profile. For example, an all the greater braking torque may be generated, the greater the criticality of the current driving situation is. On the other hand, an all the lower preparation braking torque may be generated, the less likely it is that an imminent braking request will be input by a driver or an assistance system.

This makes it possible to achieve, for example, that, on the one hand, in driving situations that are recognizably critical, a pre-activation of the brake is implemented in a timely fashion, and the actual activation is thus able to be carried out at a greater velocity and accuracy in the case that the expected braking request is present.

On the other hand, when a future braking request is to be expected with only a relatively low probability, merely a weak pre-activation of the brake may be implemented, in order not to unnecessarily disturb the driver by an accompanying pre-deceleration of the motor vehicle.

When determining the driving situation, it may be advantageous to allow at least for a velocity or acceleration of the motor vehicle, a distance to a vehicle in front, a velocity or acceleration of the vehicle in front, and an acceleration pedal actuation by the driver. This makes it possible to discern when a vehicle in front is accelerated, and when generating a preparation braking torque, for instance, for continuing an ACC control, appears to be unfavorable. In such a case, no braking preparation signal should then be generated, respectively such a signal should be canceled.

Depending on which sensors are available in a driving-situation recognition device, such as an ACC control, for example, other signals may be additionally recorded when determining the driving situation, and it may be assessed on the basis thereof whether a braking preparation signal should be generated or not. For example, a lateral position of the vehicle in front relative to one's one vehicle, a steering angle of one's own vehicle, and or a surrounding field situation, such as traffic lights up ahead, for example, other vehicles in front and the motion thereof may be taken into account.

In particular, the braking preparation control may be designed to drive the brake in response to a receipt of a braking preparation signal in a way that enables the preparation braking torque to be produced with a noise emission that is reduced in comparison to a setpoint controlled braking torque.

To this end, for example, a pump, which generates a requisite brake pressure in a hydraulic braking system, may be operated more slowly and thus at a lower noise level.

Since, in contrast to a setpoint controlled braking torque, that must typically be produced very rapidly in an active situation that requires a braking, a preparation braking torque may be generated much more slowly, and thus with a reduction in the noise emissions from the pumps used for this purpose or the like, the braking preparation control provided here makes it possible to drastically reduce the total noise emissions and thus avoid a disturbing influencing of the driver.

With the aid of specific embodiments of the braking device provided here, respectively of a method for driving such a braking device, it is possible, inter alia, to achieve the advantages described in the following:

Driving comfort may be enhanced by a more uniform deceleration characteristic and a reduction in noise emissions, in particular, due to a reduction in the volume required for a hydraulic brake, in the case of a subsequent braking.

Because of the preparation braking torque that is produced in advance, in the case of a subsequently requested braking deceleration of the vehicle, a deceleration build-up dynamics may be increased and delay times minimized. This makes it possible to improve the precision of the brake control.

When a driver briefly intervenes in the vehicle control during a drive assisted by a driver assistance system, and this driver intervention is more highly prioritized than the control of the assistance system, but the driving-situation recognition device recognizes that this driver intervention is most likely limited to a brief period of time, and the intention is to subsequently continue a situation-adapted vehicle deceleration, the slight preparation braking torque that is already subordinate during the driver intervention may immediately have a decelerating effect once the driver intervention is ended.

If, for example, during an ACC system-assisted drive, a driver briefly "overrides" a braking deceleration of the vehicle that has been requested by the ACC system, by actuating the accelerator pedal and thereby interrupts the braking deceleration, the ACC system, respectively, a corresponding driving-situation recognition device may already assess that this "overriding" merely represents a short-term driver intervention and that a braking deceleration of the vehicle is then to continue under the control of the ACC system. Subsequently thereto, a suitable braking preparation signal may be generated, in response to which, the braking preparation control then drives the brake to produce a significant pre-deceleration. Thus, the brake is at least slightly activated during the "overriding" by the driver, so that, once this "overriding" ends, a braking deceleration effect on the motor vehicle is available, and a hydraulic system, for example, does not need to again be first pressurized to achieve such a deceleration.

A best possible standby mode of the braking system may be established by building up an adapted, possibly increased activation level to prepare for an imminent introduction or continuation of an open-loop deceleration control or an anticipated braking by the driver. In a hydraulic braking system, for example, the property of torsional stiffness increasing with pressure level may be utilized by properly selecting an increased prefill level that goes beyond the mere application of the brake linings, in order to be able to subsequently build up the braking force more rapidly and/or with less generation of noise.

Utilizing a preceding braking torque from a previous braking of the motor vehicle makes it possible to minimize actuating elements of the control elements and thus noise and jerk during a subsequent braking deceleration. In a hydraulic braking system, for example, a defined residual value of the braking pressure may be "locked in" by a mere energization of a valve, without having to activate a pump. This makes it possible, inter alia, to lower the runtime load of the pump.

It should be noted that possible features and advantages of specific embodiments of the present invention are described herein partly with reference to a braking device according to the present invention, partly with reference to a method according to the present invention for driving a braking device, and partly with reference to a suitable control unit for implementing such a method. One skilled in the art will recognize that the described features may be suitably combined with one another or interchanged to arrive at other specific embodiments of the present invention and, as the case may be, synergetic effects.

DETAILED DESCRIPTION OF THE INVENTION

The figures are merely shown schematically and are not true-to-scale.

Figure 1:
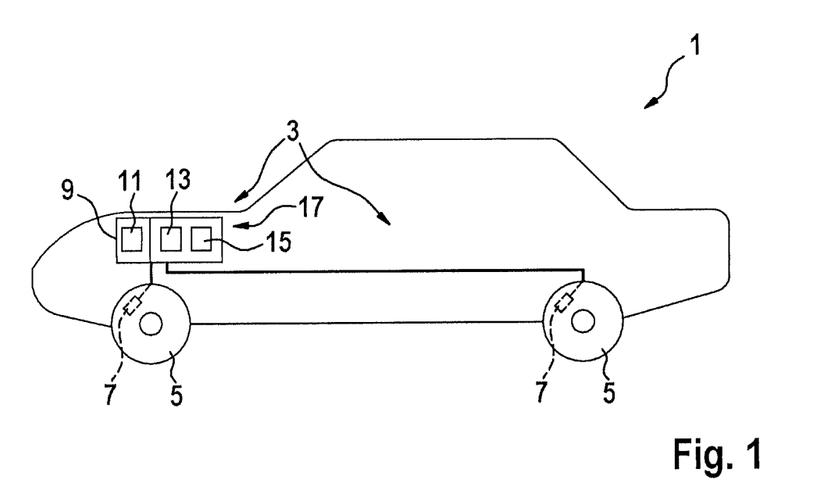
FIG. 1 shows a motor vehicle having a braking device in accordance with a specific embodiment of the present invention.

FIG. 1 shows a motor vehicle 1 that is equipped with a braking device 3 in accordance with a specific embodiment of the present invention.

Braking device 3 has a control unit 17, as well as a plurality of brakes 7, which each cooperate with one of wheels 5 of motor vehicle 1. In control unit 17, both a setpoint controlled, open-loop deceleration control 13, as well as a braking preparation control 15 are provided. Also provided is a driving-situation recognition device 11, which, in the illustrated example, is part of a closed-loop control 9 of an autonomous cruise control (ACC). Suitable interfaces (not shown) are provided within control unit 17 to allow signals to be exchanged among individual components 9, 11, 13, 15.

It should be noted that a common control unit for the braking device and the ACC is shown in FIG. 1. Alternatively, however, separate control units having external signals for setpoint deceleration and braking preparation may be used in modern vehicles to implement the braking device according to the present invention.

Figure 2:
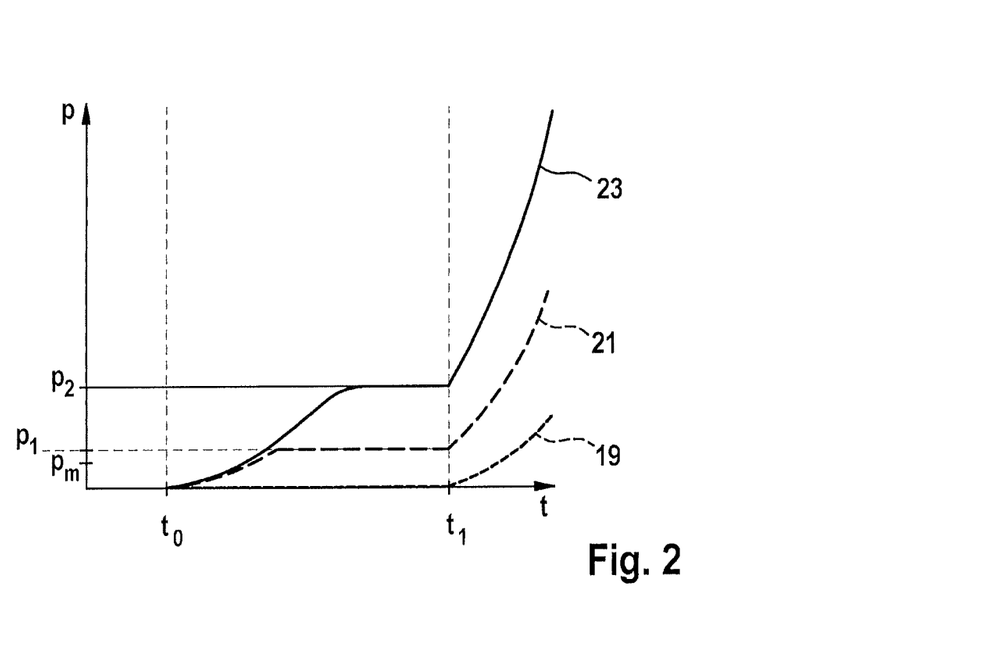
FIGS. 2 and 3 illustrate examples of a characteristic curve of a braking pressure for generating a braking torque, as may be produced using a braking device in accordance with a specific embodiment of the present invention.
Figure 3:
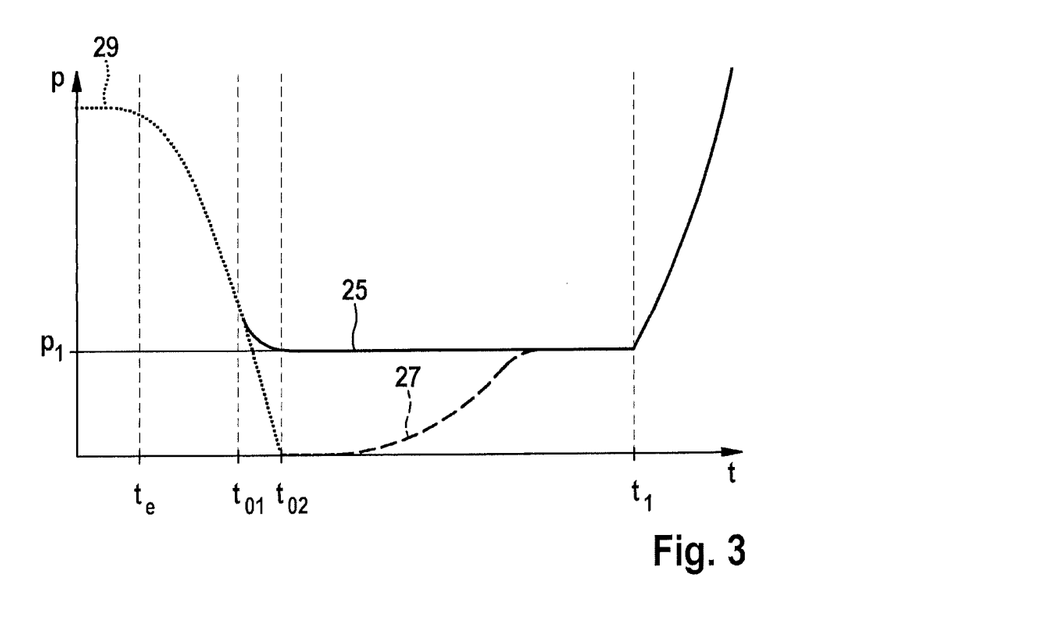

FIGS. 2 and 3 show the time characteristics of braking pressures p for generating a braking torque M, as may be produced using a braking device 3 in accordance with one specific embodiment of the present invention. In this connection, a braking pressure p may act in a hydraulic braking system, for example, and thereby produce a corresponding braking torque M on the vehicle. Alternatively, however, braking torque M to be generated may also be produced using other non-hydraulic braking systems, for example, such as an electric machine operated in the generator mode of an electric-powered or hybrid vehicle.

In FIG. 2, curve 19 shows the profile of a braking pressure p, as is typically generated when working with a conventional braking device. In response to a braking request being executed in the braking device by a driver or an assistance system at point in time $t_1$, pressure p generated in the braking device continuously rises. Since in the case of hydraulic brakes, for example, a certain pressure must be generated in the hydraulic system in order to overcome a clearance between the brake linings and the brake disk, to then allow a pressure from the brake linings to act on the brake disks, a certain period of time elapses until the deceleration that actually brakes the motor vehicle commences, i.e., until braking pressure p reaches a requisite minimum value $p_m$ for a significant deceleration.

Curves 21 and 23 in FIG. 2 illustrate braking pressures, as may be generated in a braking device according to the present invention.

At a point in time $t_0$, a driving-situation recognition device discerns that a driving situation is at hand where a braking request from a driver or an assistance system is to be very likely expected within a brief future time interval. The driving-situation recognition device subsequently emits a braking preparation signal. In response to this braking preparation signal, the braking preparation control of the braking device drives the brakes in a way that allows at least a predetermined minimum preparation braking pressure $p_1$ to be reached, as shown in curve 21, or, alternatively, an increased preparation braking pressure $p_2$, as shown in curve 23.

In this context, the magnitude and the profile of this preparation braking pressure build-up may be selected as a function of the probability with which the braking request is to be expected and or as a function of the criticality of the current driving situation. Preferably, however, preparation braking pressure $p_1$, $p_2$ is built up more slowly than would be necessary for generating a setpoint controlled braking torque, so that a hydraulic pump used for this purpose may operate more slowly and thus quietly, for example, than when a setpoint operated braking torque is generated.

When, in the case of a brake prepared in this manner, a braking request is then actually issued by a driver or an assistance system at point in time $t_1$, a braking pressure p that produces braking torque M to be generated may be rapidly increased starting from already generated preparation braking pressure $p_1$, $p_2$. Thus, a deceleration of the vehicle may be implemented more rapidly and with higher precision than was the case when working with conventional braking devices without generating a preparation braking torque.

FIG. 3 shows various profiles of the braking pressure in a braking device according to the present invention for a scenario where, in the course of a preceding braking operation up to a point in time $t_e$, a high braking torque 29 was already generated at the brake and was then successively reduced by termination of the braking request.

For example, up to point in time $t_e$, a braking operation is controlled by an autonomous cruise control that is then interrupted in a prioritized process by the driver actuating the accelerator pedal, thereby successively reducing braking pressure p.

If, at a point in time $t_{01}$, when the previously prevailing braking pressure has not yet been reduced to a minimum value $p_1$, which corresponds to a preparation braking torque, a driving-situation recognition device discerns that, in all probability, a braking request will soon be executed again by the driver or the assistance system, a braking preparation signal may be generated. In response to this braking preparation signal and with the aid of the braking preparation control, braking pressure 29, which produces the previously generated, setpoint controlled braking torque, is merely minimally lowered to braking pressure $p_1$, which generates the preparation braking torque. In the case of a hydraulic braking device, for example, following curve 25, the braking pressure may then be maintained at this preparation braking pressure $p_1$ until the expected braking request is received at a point in time $t_1$, whereupon the braking pressure is substantially increased under setpoint control.

Alternatively, if at a point in time $t_{02}$, i.e., after the preceding setpoint controlled braking pressure 29 has dropped below a pressure $p_1$ that is minimally necessary for a preparation braking torque, a driving-situation recognition device first discerns that, in all likelihood, a braking request will soon be executed again, it is, in fact, not possible for braking pressure 29 built up during the previous braking operation to be utilized as in curve 25. Rather, following curve 27, a preparation braking pressure $p_1$ may be slowly built up once again.

It is expedient that a magnitude of the preparation braking torque to be generated be at least as great as that required for providing braking readiness. In the case of hydraulic braking systems, this may correspond to the pressure level of a known prefill function (dead volume compensation). In this context, the brake linings of the brake are applied to the brake disk without noticeably decelerating the vehicle, however. Moreover, situationally higher preparation braking torques may be advantageous, for example, to further reduce an elasticity of the braking system or to selectively impress a slight deceleration in order to prepare an expected brake intervention during a braking request input by a driver or an assistance system.

The preparation braking torque to be generated is to be understood here as the minimum braking torque to be set, that is to be maintained, respectively built up. If a simultaneously functioning setpoint operated longitudinal control requires a higher braking torque during a braking request, then the latter is to be realized.

The desired preparation braking torque is preferably generated to be as jerk-free and low-noise as possible. An existing braking torque from a preceding setpoint controlled braking may be obtained, respectively, if indicated, reduced to the preparation braking torque to be realized. If a braking torque is to be first built up, then this may preferably take place as unobtrusively as possible, in consideration of the specific properties of the braking system. In the case of a braking system having a hydraulic pump, the pressure build-up dynamics are preferably to be realized in a way that allows the pressure to be built up at a low pump speed and thus with low noise emissions.

A brake intervention may then be subsequently carried out in an uninterrupted operation from the level of the preparation braking torque, utilizing the improved properties of the braking system, such as a lower volume requirement, for example, due to a lower elasticity in the case of a hydraulic braking system.

The following describes examples for implementing a braking device, respectively a control unit according to the present invention for implementing a method for driving such a braking device.

An autonomous cruise control ACC is used for continuously controlling the velocity of a motor vehicle in closed loop in accordance with a setpoint selection; in the closed-loop control, a distance to a vehicle in front being included as an additional feedback and controlled variable. As soon as the autonomous cruise control recognizes that one's own vehicle is coming too close to the vehicle in front, a braking request is transmitted to a setpoint operated, closed-loop deceleration control of a braking device, in order to brake one's own vehicle and thereby prevent it from falling below a minimum distance to a vehicle in front.

One option often used by a driver to influence the vehicle stopping distance or the last phase of the vehicle stopping process in accordance with his/her own wishes, is to use the accelerator pedal to temporarily override the active autonomous cruise control. Since the driver input is always accorded the highest priority, in the context of conventional braking devices and ACC controls, a braking torque actually required for the ongoing closed-loop control is completely reduced in these cases, and the drive is controlled in accordance with the driver input.

A braking deceleration of the vehicle is only resumed upon ending of the driver intervention. A high gradient of the braking pressure, respectively braking torque must be realized in the process to fulfill the deceleration request from the autonomous cruise control. Since this gradient must be induced when the braking system is in an unpressurized state, this may lead to disturbing noise in the braking system. Moreover, the braking system has an unavoidable reaction time until the requested vehicle deceleration is restored. To nevertheless bring the vehicle to a standstill within a requisite minimum distance, or to maintain a requisite minimum distance behind the vehicle driving slowly ahead, the automatic controller in the autonomous cruise control must raise the vehicle deceleration and/or the jerk thereof to values that are uncomfortable for the driver.

One specific embodiment of the braking device presented here, respectively of the method for driving this braking device makes it possible to provide an algorithm in the autonomous cruise control that enables braking system noise and uncomfortable vehicle decelerations to be reduced, respectively prevented following an override by the driver.

When a driving-situation recognition device implemented in such a system recognizes that, in all likelihood, a braking request will again be transmitted in the near future to the setpoint operated, closed-loop deceleration control, a braking preparation signal is generated. In response thereto, a braking preparation control included in the braking device has the effect that a braking torque present from a preceding braking operation, respectively a residual braking pressure is not completely reduced, respectively a braking torque, respectively a braking pressure, is built up anew, for example via a prefill function of the braking system. The braking device is thereby prepared for a pending continuation of the setpoint controlled, closed-loop deceleration control and a braking deceleration to be expected.

Thus, following an override by the driver, a pressure build-up noise may be reduced, a braking comfort improved, and the precision of the closed-loop control enhanced.

In the simplest case, the braking preparation signal may be a simple binary signal. Alternatively, a variable magnitude may be transmitted as a braking preparation signal that, as a function of the current driving situation, may represent a recommendation for the magnitude of the maintained preparation braking torque, respectively of that to be newly generated.

It may be provided, for example, that the braking preparation signal only be able to be generated within one adjustable velocity range within which problems with noise, vibration, and/or harshness (often also referred to as NVH) or with comfort are to be expected.

The braking preparation signal should only be transmitted by the autonomous cruise control when, for example, the driving situation recorded by existing environmental sensors makes a braking deceleration likely following an override by the driver, for example. In other cases, generating a preparation braking torque would lead to an unacceptable degradation of the function of the autonomous cruise control.

To be able to determine those driving situations in which a preparation braking torque is supposed to be requested, i.e., a braking preparation signal is supposed to be generated, the following variables are to be considered: (a) vehicle velocity, respectively vehicle acceleration; (b) distance to the vehicle driving ahead; (c) velocity, respectively acceleration of the vehicle driving ahead; and (d) accelerator-pedal actuation by the driver. This makes it possible to discern, for example, when the vehicle driving ahead is accelerating and a braking torque for maintaining the closed-loop autonomous cruise control is unfavorable. In such cases, no braking preparation signal should be generated, respectively, such a signal should be canceled.

Depending on which sensors are available in an autonomous cruise control, other sensors may be used for assessing the driving situation, respectively a requisite subsequent braking, such as a signal indicating information about a lateral position of the vehicle driving ahead relative to one's own vehicle, a steering angle of one's own vehicle, and/or a surrounding field situation, such as a traffic light or other vehicles driving up ahead and the motion, thereof, for example.

In one specific exemplary situation of a high-velocity drive controlled by an autonomous cruise control, an object is recognized that, in all likelihood, may be classified as a vehicle driving ahead at a slower speed or an obstacle, but the certainty is not yet enough for immediately introducing a forceful vehicle deceleration since this would entail the danger of an erroneous activation. Depending on the reliability of the situation recognition and/or the degree of criticality, to be assessed, for example, on the basis of the difference in the velocity between one's own vehicle and the vehicle driving ahead, an adapted preparation braking torque may be realized that has a slight decelerating effect on the vehicle and puts the vehicle brake into a heightened state of braking readiness, without already specifying a target value for a longitudinal control in the course of a setpoint operated, closed-loop deceleration control. A subsequent closed-loop deceleration control may then be realized when necessary with a slight time delay and high dynamic response.

There is another use for specific embodiments of the braking device provided here, respectively of methods for the driving thereof, when it comes to what are generally referred to as predictive safety systems. Autonomous partial braking and emergency braking interventions are often preceded by a braking intervention by the driver. If this is interrupted, then, in conventional systems, the brake is initially completely disengaged or only held in readiness, i.e., in the case of minimum prefill, independently of an already recognizable degree of the criticality of the situation and of a probability of an emergency braking intervention to be expected. Not until the emergency brake is released does an activation of the braking system begin, the vehicle initially being in the freely rolling state, while merely minimally decelerated by drag torques. In the case of a hydraulic braking system, the dynamic response of the deceleration buildup is all the less, the less braking pressure is already present in the braking system, which is due to the elasticity characteristic of hydraulic braking systems. In an initial state of a completely disengaged brake, the loss of time at the beginning of a braking operation is, therefore, quite considerable, which limits the effectiveness of an emergency-braking function.

In the case of the braking device presented here, already before the actual requesting of the emergency braking, a preparation braking torque may be produced by suitably driving the brake, so that, as soon as the emergency braking request is actually received, the braking torque may be built up without delay. The fact that such a preparation braking torque gives rise to a pre-deceleration of the motor vehicle that is significant and perhaps perceivable by the driver, may be tolerated, particularly when the preparation braking torque brings about an improvement of the driving safety of the vehicle.

As a final example of applications of specific embodiments of the braking device provided here, respectively of the driving thereof, an autonomous stopping on a hill in the course of a subsequent ACC drive is described. This requires a grade-dependent braking torque that is supposed to be built up as rapidly as possible and ideally at the reversal point of a vehicle motion. In the case that such a situation is recognized, for example, on the basis of the grade, velocity and/or acceleration, the described braking preparation may be requested to maintain any existing braking torque, respectively to build up a preparation braking torque. The braking torque required for stopping the vehicle may then be built up more rapidly and, in some instances, with less noise.

What is claimed is:

1. A braking device for a motor vehicle, comprising:
a setpoint controlled deceleration device, which, upon receipt of a braking request input by a driver or an assistance system, on the basis of one of (i) a predefined setpoint value or (ii) a difference between the setpoint value and an actual value, drives a brake to generate a setpoint controlled braking torque for a setpoint value-oriented deceleration of the motor vehicle;
a driving situation recognition device comprising a plurality of sensors, which, upon receipt of a plurality of inputs from the plurality of sensors, determines a driving situation value based on the plurality of inputs from the plurality of sensors, and, which, upon the driving situation value reaching a value greater than an objective driving situation threshold value, generates a braking preparation signal and triggers a braking preparation control unit with the braking preparation signal to drive the brake, wherein the plurality of inputs from the plurality of sensors includes at least one of: a distance to a vehicle in front input, a lateral position to a vehicle in front input, a velocity of a vehicle in front input, a velocity of the motor vehicle input, a surrounding traffic environment situation input, and a steering angle input; and
the braking preparation control unit, which, upon receipt of the braking preparation signal, automatically drives the brake independently of a driver power demand action and independently of the setpoint value to produce at least one preparation braking torque for a preparatory deceleration of the motor vehicle.

2. The braking device as recited in claim 1, wherein the preparatory deceleration of the motor vehicle is at least 0.1 m/s$^2$.

3. The braking device as recited in claim 2, wherein the braking preparation control unit drives the brake to implement the generation of the preparatory braking torque with a noise emission which is reduced in comparison to a generation of a setpoint controlled braking torque.

4. The braking device as recited in claim 2, wherein the braking preparation control unit, upon receipt of the braking preparation signal and without the presence of a preceding generation of a setpoint operated braking torque, drives the brake to increase the braking torque produced by the brake up to the preparation braking torque.

5. The braking device as recited in claim 2, wherein in response to receipt of the braking preparation signal and in the case a setpoint controlled braking torque is currently being applied that is greater than the preparation braking torque, the braking preparation control unit drives the brake to lower the previously generated setpoint controlled braking torque minimally to the preparation braking torque.

6. The braking device as recited in claim 2, wherein the braking preparation control unit is configured to (i) receive different types of braking preparation signals and, (ii) as a function of the received braking preparation signal, drive the brake to generate a braking preparation signal-specific preparation braking torque for the preparatory deceleration of the motor vehicle.

7. The braking device as recited in claim 2, wherein in response to receipt of the braking preparation signal and in the case a setpoint controlled braking torque is currently being applied that is lower than the preparation braking torque, the braking preparation control unit drives the brake to increase the braking torque produced by the brake up to the preparation braking torque.

8. A method for controlling a braking device in a host vehicle, comprising:
determining, by a driving situation recognition device having at least one processor and a plurality of sensors and upon receipt of a plurality of inputs from the plurality of sensors, a driving situation value based on the plurality of inputs from the plurality of sensors, wherein the plurality of inputs from the plurality of sensors includes at least one of: a distance to a vehicle in front input, a lateral position to a vehicle in front input, a velocity of a vehicle in front input, a velocity of the motor vehicle input, a surrounding traffic environment situation input, and a steering angle input;
generating a braking preparation signal upon the driving situation value reaching a value greater than a an objective driving situation threshold value; and
automatically driving, by a braking preparation control unit having at least one processor, the braking device independently of a driver power demand action to produce at least one preparation braking torque for a preparatory deceleration of the host vehicle upon receiving the braking preparation signal at the braking preparation control unit of the braking device.

9. The method as recited in claim 8, wherein different types of braking preparation signals are generated as a function of a criticality of a current driving situation.

10. A control unit for a motor vehicle, comprising:
a setpoint-based deceleration control device, which, upon receipt of a braking request input by a driver or an assistance system, on the basis of one of (i) a predefined setpoint value or (ii) a difference between the setpoint value and an actual value, drives a brake to generate a setpoint controlled braking torque for a setpoint value-oriented deceleration of the motor vehicle;

a driving situation recognition device comprising a plurality of sensors, which, upon receipt of a plurality of inputs from the plurality of sensors, determines a driving situation value based on the plurality of inputs from the plurality of sensors, and, which, upon the driving situation value reaching a value greater than an objective driving situation threshold value, generates a braking preparation signal and triggers a braking preparation control unit with the braking preparation signal to drive the brake, wherein the plurality of inputs from the plurality of sensors includes at least one of: a distance to a vehicle in front input, a lateral position to a vehicle in front input, a velocity of a vehicle in front input, a velocity of the motor vehicle input, a surrounding traffic environment situation input, and a steering angle input; and the braking preparation control unit, which, upon receipt of the braking preparation signal, automatically drives the brake independently of a driver power demand action and independently of the setpoint value to produce at least one preparation braking torque for a preparatory deceleration of the motor vehicle.

11. A braking device for a motor vehicle, comprising:

a setpoint controlled deceleration device, which, upon receipt of a braking request input by a driver or an assistance system, on the basis of one of (i) a predefined setpoint value or (ii) a difference between the setpoint value and an actual value, drives a brake to generate a setpoint controlled braking torque for a setpoint value-oriented deceleration of the motor vehicle; and a braking preparation control unit, which, upon receipt of a braking preparation signal generated based on a plurality of inputs from a plurality of sensors, the plurality of inputs including at least one of: a distance to a vehicle in front input, a lateral position to a vehicle in front input, a velocity of a vehicle in front input, a velocity of the motor vehicle input, a surrounding traffic environment situation input, and a steering angle input, is triggered to drive the brake automatically independently of a driver power demand action and independently of the setpoint value to produce at least one preparation braking torque for a preparatory deceleration of the motor vehicle, wherein in response to receipt of the braking preparation signal and in the case a setpoint controlled braking torque is currently being applied that is greater than the preparation braking torque, the braking preparation control unit drives the brake to lower the previously generated setpoint controlled braking torque minimally to the preparation braking torque.

12. The braking device as recited in claim 11, further comprising:

a driving situation recognition device comprising the plurality of sensors, which, upon receipt of the plurality of inputs from the plurality of sensors, determines a driving situation value based on the plurality of inputs from the plurality of sensors, and, which, upon the driving situation value reaching a value greater than an objective driving situation threshold value, generates the braking preparation signal and triggers the braking preparation control unit with the braking preparation signal to drive the brake.

* * * * *